US007933692B2

(12) United States Patent
Hiroshima

(10) Patent No.: US 7,933,692 B2
(45) Date of Patent: Apr. 26, 2011

(54) OUTBOARD MOTOR CONVERSION UNIT

(75) Inventor: Naoki Hiroshima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 972 days.

(21) Appl. No.: 11/823,366

(22) Filed: Jun. 27, 2007

(65) Prior Publication Data

US 2008/0015747 A1 Jan. 17, 2008

(30) Foreign Application Priority Data

Jul. 14, 2006 (JP) ................................ 2006-193714

(51) Int. Cl.
*G06F 17/00* (2006.01)

(52) U.S. Cl. ................. 701/21; 701/36; 701/41; 701/51

(58) Field of Classification Search .................... 701/21, 701/36, 41, 51, 67, 70, 101; 114/144 R
See application file for complete search history.

(56) References Cited

U.S. PATENT DOCUMENTS

| | | | | |
|---|---|---|---|---|
| 5,142,473 | A * | 8/1992 | Davis | 701/21 |
| 6,910,927 | B2 | 6/2005 | Kanno | |
| 2005/0199169 | A1 * | 9/2005 | Mizutani | 114/144 RE |

* cited by examiner

*Primary Examiner* — Richard M. Camby
(74) *Attorney, Agent, or Firm* — Carrier Blackman & Associates, P.C.; Joseph P. Carrier; William D. Blackman

(57) ABSTRACT

In an outboard motor conversion unit, it is configured to have a boat-side conversion unit that detects displacement generated at a movable member due to manual manipulation of a mechanical operation mechanism and converts the detected displacement into an electric signal, actuators connected to a steering mechanism, a shift mechanism and a throttle valve of an internal combustion engine of the outboard motor, and an actuator controller that controls operation of the actuators based on the converted electric signal. With this, the outboard motor installed at a boat with the mechanical operation mechanism can be easily converted to an electronically-operated outboard motor without newly installing a remote control unit or the like.

7 Claims, 3 Drawing Sheets

OUTBOARD MOTOR CONVERSION UNIT

BACKGROUND OF THE INVENTION

1. Field of the Invention

This invention relates to a conversion unit of an outboard motor, particularly to an outboard motor conversion unit attached to an outboard motor in which a steering mechanism or the like is operated by manually manipulating a mechanical operation mechanism installed at a boat, for converting the outboard motor to electronically-operated type.

2. Description of the Related Art

Conventionally, an outboard motor equipped with a so-called mechanical operation mechanism is widely used, in which a steering wheel installed at a boat is connected to a steering mechanism of the outboard motor through a push-pull cable and the like and the outboard motor is steered by transmitting rotation of the steering wheel to the steering mechanism, while a shift/throttle lever installed at the boat is connected to a shift mechanism and throttle valve of the outboard motor through the push-pull cable and the like and shift change or engine speed regulation is conducted by transmitting manual manipulation of the shift/throttle lever to the mechanisms.

Further, in recent years, an outboard motor configured to conduct steering, shift change or engine speed regulation by controlling the operation of actuators connected to a steering mechanism, shift mechanism and throttle valve of the outboard motor, i.e., an electronically-operated outboard motor is proposed as taught, for example, in U.S. Pat. No. 6,910,927.

In the outboard motor disclosed in the prior art, a boat is required to be equipped with a specific operation mechanism. Specifically, it becomes necessary to have an electronic operation mechanism including a steering wheel angle sensor installed near a steering wheel for outputting a driving signal to the actuator of the steering mechanism so as to establish steering angle detected by the steering wheel angle sensor and a lever position sensor installed near a shift/throttle lever for outputting a driving signal to the actuator of the shift mechanism or throttle valve so as to achieve a shift position or engine speed corresponding to the lever position detected by the lever position sensor.

In order to change a mechanically-operated outboard motor to an electronically-operated one, a remote control unit or the like designed for the electronically-operated outboard motor and having an electronic operation mechanism is needed to be newly installed near the operator's seat of the boat. In that case, since the outboard motor can be steered with the remote control unit, the hitherto-used mechanical operation mechanism becomes unnecessary. Thus, when an outboard motor equipped with a mechanical operation mechanism is changed to an electronically-operated outboard motor, it is necessary to replace the mechanical operation mechanism with the remote control unit, making the changing procedure inconvenient.

SUMMARY OF THE INVENTION

An object of this invention is therefore to overcome the foregoing drawback by providing an outboard motor conversion unit that enables to easily convert an outboard motor equipped with a mechanical operation mechanism to an electronically-operated outboard motor.

In order to achieve the object, this invention provides a conversion unit attachable to an outboard motor adapted to be mounted on a boat and having an internal combustion engine that powers a propeller, a steering mechanism that steers the outboard motor, and a shift mechanism that shifts gears to change a moving direction of the boat, at least one of which is operable by a mechanical operation mechanism installed at the boat to be manually manipulated by an operator, comprising: a boat-side conversion unit that detects displacement generated at a movable member due to the manual manipulation of the mechanical operation mechanism and converts the detected displacement into an electric signal; an actuator that is connected to at least one of the steering mechanism, the shift mechanism and a throttle valve of the engine; and an actuator controller that is connected to the boat-side conversion unit and controls operation of the actuator based on the converted electric signal.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

An outboard motor conversion unit according to an embodiment of the present invention will now be explained with reference to the attached drawings.

Figure 1:
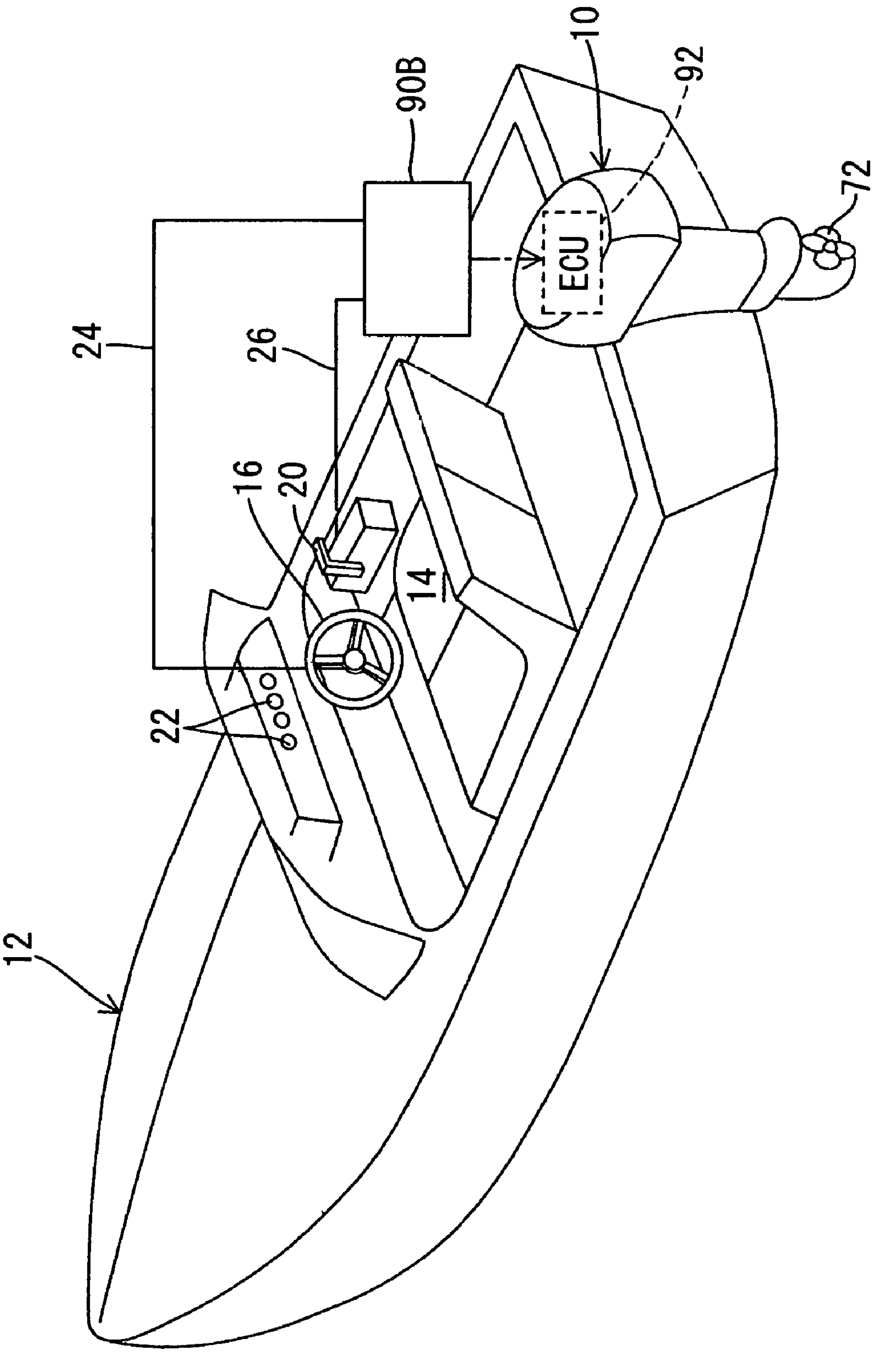
FIG. 1 is an overall schematic view of an outboard motor equipped with an outboard motor conversion unit, including a boat (hull), according to an embodiment of the invention.

FIG. 1 is an overall schematic view of an outboard motor equipped with an outboard motor conversion unit, including a boat (hull), according to an embodiment of the invention.

In FIG. 1, reference numeral 10 indicates an outboard motor. As illustrated, the outboard motor 10 is mounted on the stem or transom of a boat or hull 12. A steering wheel 16 is installed near an operator's seat or cockpit 14 of the boat 12. The steering wheel 16 is freely operated to rotate by the operator.

A shift/throttle lever 20 and a plurality of indicator lamps (indicator) 22 are installed near the operator's seat 14 of the boat 12. The shift/throttle lever 20 is freely operated to swing by the operator.

The steering wheel 16 and shift/throttle lever 20 are connected to push-pull cables (wire cables) 24, 26, respectively. Specifically, the boat 12 is installed with a mechanical operation mechanism comprising the steering wheel 16, shift/throttle lever 20, push-pull cables 24, 26 and other components. One ends of the push-pull cables 24, 26 (i.e., ends on the opposite side from the other ends connected to the steering wheel 16 and shift/throttle lever 20) are equipped with movable members (not shown in FIG. 1) that move or displace in response to manual manipulation of the steering wheel 16 and shift/throttle lever 20. The movable members are connected to an analog signal outputting device of a motor-side conversion unit, which is explained later.

Figure 2:
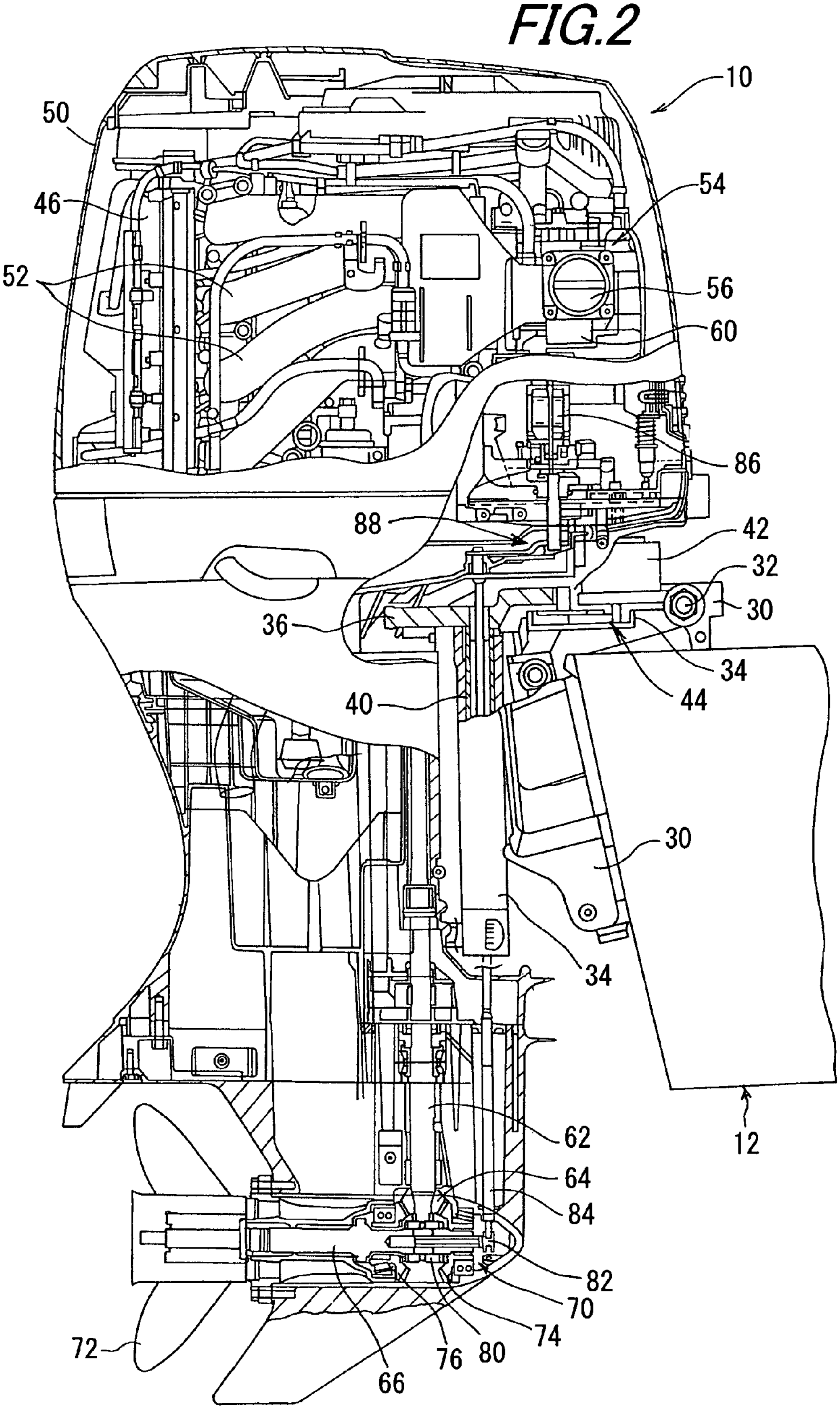
FIG. 2 is an enlarged cross-sectional side view partially showing the outboard motor shown in FIG. 1.

FIG. 2 is an enlarged cross-sectional side view partially showing the outboard motor 10 shown in FIG. 1.

As shown in FIG. 2, the outboard motor 10 is equipped with stem brackets 30 fastened to the stem of the boat 12 and connected to a swivel case 34 through a tilting shaft 32. The outboard motor 10 is also equipped with a mount frame (steering mechanism) 36 having a shaft 40. The shaft 40 is housed in the swivel case 34 to be freely rotated about a vertical axis. The upper end of the mount frame 36 and the lower end thereof, i.e., lower end of the shaft 40, are fastened to a frame (not shown) constituting the main body of the outboard motor 10.

The upper portion of the swivel case 34 is installed with an electric steering motor (actuator) 42 that drives the shaft 40. The output shaft of the steering motor 42 is freely connectable to the upper end of the mount frame 36 via a speed reduction gear mechanism 44. Specifically, a rotational output generated by driving the steering motor 42 is transmitted via the speed reduction gear mechanism 44 to the mount frame 36 such that the outboard motor 10 is steered about the shaft 40 as a steering axis to the right and left directions (i.e., steered about the vertical axis). Thus the mount frame 36 performs as "the steering mechanism" that uses the steering motor 42 to steer the outboard motor 10 laterally.

The outboard motor 10 is equipped at its upper portion with an internal combustion engine (hereinafter referred to as "engine") 46. The engine 46 comprises a spark-ignition, water-cooling gasoline engine with a displacement of 2200 cc. The engine 46 is located above the water surface and covered by an engine cover 50.

An intake pipe 52 of the engine 46 is connected to a throttle body 54. The throttle body 54 has a throttle valve 56 installed therein and an electric throttle motor (actuator) 60 is integrally disposed thereto to open and close the throttle valve 56. The output shaft of the throttle motor 60 is freely connectable to the throttle valve 56 via a speed reduction gear mechanism (not shown) disposed near the throttle body 54. Specifically, the throttle motor 60 is driven to open and close the throttle valve 56, thereby regulating the flow rate of the air sucked in the engine 46 to control the engine speed.

The outboard motor 10 is equipped with a drive shaft (vertical shaft) 62 that is installed parallel to the vertical axis and rotatably supported. One end, i.e., the upper end of the drive shaft 62 is connected to a crankshaft (not shown) of the engine 46 and the other end, i.e., the lower end thereof is equipped with a pinion gear 64.

The pinion gear 64 at the lower end of the drive shaft 62 is installed via a shift mechanism 70 with a propeller shaft 66 supported to be freely rotated about the horizontal axis. As shown in FIG. 2, one end of the propeller shaft 66 is attached with a propeller 72. The shift mechanism 70 comprises a forward bevel gear 74, reverse bevel gear 76, clutch 80, shift slider 82 and shift rod 84.

The forward bevel gear 74 and reverse bevel gear 76 are disposed onto the outer periphery of the propeller shaft 66 to be rotatable in opposite directions by engagement with the pinion gear 64. The clutch 80 is installed between the forward bevel gear 74 and reverse bevel gear 76 and is rotated integrally with the propeller shaft 66. The clutch 80 makes the shift rod 84 rotate to displace the shift slider 82 such that the clutch 80 can be freely engaged with one or the other of the forward bevel gear 74 and reverse bevel gear 76.

An interior of the engine cover 50 accommodates an electric shift motor (actuator) 86 therein that drives the shift mechanism 70. The output shaft of the shift motor 86 is freely connectable to the shift mechanism 70, i.e., the upper end of the shift rod 84 through a speed reduction gear mechanism 88. Specifically, the rotation of the shift rod 84 generated by driving the shift motor 86 displaces the shift slider 82 to make the clutch 80 engage with one of the forward bevel gear 74 and reverse bevel gear 76.

The rotation of the drive shaft 62 is converted to the rotation about the horizontal axis by the pinion gear 64 and bevel gears 74, 76 and transmitted to the propeller shaft 66 through the clutch 80 engaged with one of the bevel gears 74, 76, thereby rotating the propeller 72 either direction to move the boat 12 forward or backward.

When the shift motor 86 is driven to displace the shift slider 82 to an appropriate position, the engagement of the clutch 80 with one of the bevel gears 74, 76 is released. Specifically, the shift motor 86 is driven to operate the clutch 80 of the shift mechanism, thereby changing the gears (shift position) among the forward, reverse and neutral positions. The shift mechanism 70 shifts the gears to change a moving direction of the boat.

Thus the outboard motor 10 is a so-called electronically-operated outboard motor that is configured to conduct outboard motor steering, shift change or engine speed regulation by controlling the operation of the motors or actuators 42, 60, 86 connected to the steering mechanism, shift mechanism and throttle valve.

Figure 3:
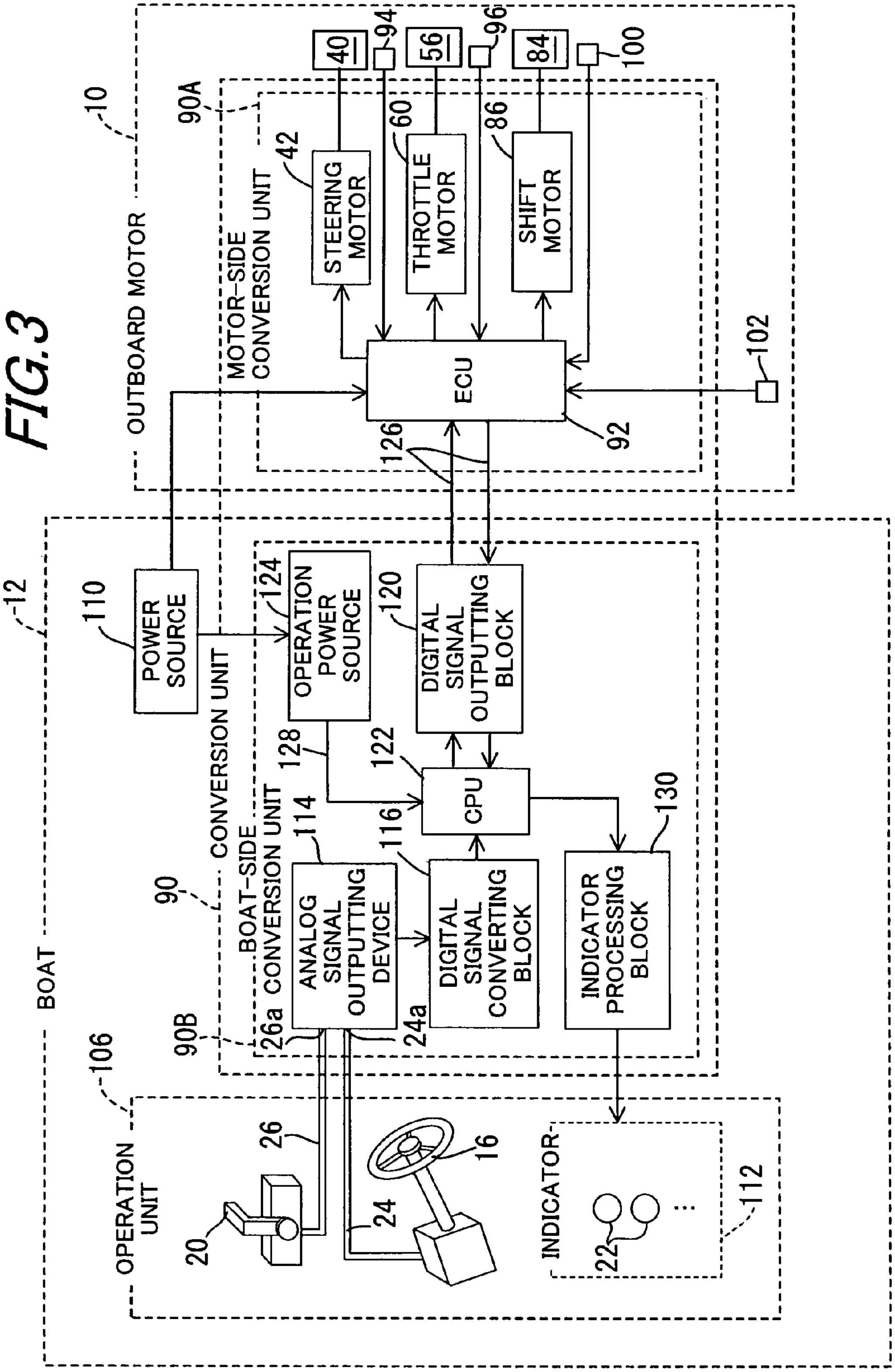
FIG. 3 is a block diagram showing the structure of the outboard motor and boat shown in FIG. 1 in detail.

FIG. 3 is a block diagram showing the structure of the outboard motor 10 and boat 12 shown in FIG. 1 in detail.

As shown in FIG. 3, the outboard motor 10 and boat 12 are installed with a conversion unit 90 that is freely attachable to the outboard motor 10 in which the steering mechanism, shift mechanism and throttle valve are operated by manually manipulating the mechanical operation mechanism, i.e., the steering wheel 16 and shift/throttle lever 20, disposed at the boat 12. The conversion unit disposed on the outboard motor side is hereinafter called the "motor-side conversion unit" and designated by a symbol 90A, and that disposed on the boat side called the "boat-side conversion unit" and designated by a symbol 90B.

The motor-side conversion unit 90A comprises the steering motor 42, throttle motor 60, shift motor 86 and an ECU (Electronic Control Unit; actuator controller) 92 that controls the operation of the motors. The ECU 92 constituted as a microcomputer having a CPU, ROM, RAM etc., and installed underneath the engine cover 50 (not shown in FIG. 3).

As shown in FIG. 3, a steering angle sensor 94 is installed near the shaft 40 of the outboard motor 10 and produces an output or signal indicative of the steering angle of the outboard motor 10, i.e., rotation angle of the shaft 40. A throttle position sensor 96 is installed near the throttle valve 56 of the outboard motor 10 and produces an output or signal in response to the opening of the throttle valve 56. A shift position sensor 100 is installed near the shift rod 84 of the outboard motor 10 and produces an output or signal indicative of the shift position, i.e., rotation angle of the shift rod 84. The outputs of the aforesaid sensors 94, 96, 100 are sent to the ECU 92.

A coolant temperature sensor 102 is installed at the engine 46 (not shown in FIG. 3) of the outboard motor 10 and produces an output or signal indicating coolant temperature. A plurality of sensors (not illustrated) other than the coolant temperature sensor 102 are also installed at the outboard motor 10 and produce outputs or signals representing the operating condition of the outboard motor 10.

On the other hand, the boat 12 is disposed with an operation unit 106, the boat-side conversion unit 90B which is a part of the conversion unit 90, and a power source (battery) 110. The operation unit 106 is composed of an operation system and instruments required to operate the outboard motor 10, specifically, in addition to the above-mentioned mechanical operation mechanism having the steering wheel 16, shift/throttle lever 20 etc., an indicator 112 and the like. The indicator 112 comprises a plurality of the foregoing indicator lamps 22.

The boat-side conversion unit 90B comprises an analog signal outputting device (operation system analog sensor switch) 114 that outputs an analog signal in response to displacement generated at the movable members (explained later) of the mechanical operation mechanism, a digital signal converting block (analog data processing block) 116 that converts the outputted analog signal into a digital signal, a digital signal outputting block (CAN communication block) 120 that outputs the converted digital signal to the ECU 92 through a CAN (Controller Area Network) communication, a CPU (Central Processing Unit; main processor) 122 that controls their operation and an operation power source (power source block) 124 that supplies operation power to the CPU 122. The power source 110 is connected to the operation power source 124, ECU 92 of the outboard motor 10 and the like to supply the operation power thereto.

The foregoing elements making up the boat-side conversion unit 90B will be explained. The analog signal outputting device 114 is connected to the movable members 24*a*, 26*a* of the push-pull cables 24, 26 connected to the steering wheel 16 and shift/throttle lever 20, as described. The movable members 24*a*, 26*a* are moved or displaced in response to manual manipulation of the steering wheel 16 and shift/throttle lever 20.

The analog signal outputting device 114 detects displacement generated at the movable members 24*a*, 26*a* and outputs an analog signal, i.e., an electronic signal. It should be noted that the analog signal outputting device 114 is a sensor or switch outputting an analog signal and, for example, composed of a potentiometer, slide volume or the like, which changes in its resistance value in response to manipulated variable of the steering wheel 16 etc. Specifically, the movable member 24*a* moved by rotational operation of the steering wheel 16 is connected to a potentiometer as the analog signal outputting device 114, while the movable member 26*a* moved by swinging operation (linear displacement) of the shift/throttle lever 20 is connected to a slide volume as the analog signal outputting device 114.

Thus when displacement is generated at the movable members 24*a*, 26*a* of the push-pull cables by manipulating the steering wheel 16 or shift/throttle lever 20, the analog signal outputting device 114 detects the displacement and outputs an analog signal.

The digital signal converting block 116 is inputted with the analog signal outputted from the analog signal outputting device 114, processes the analog signal, i.e., converts it to a digital signal (electronic signal) and send the same to the digital signal outputting block 120 through the CPU 122.

The digital signal outputting block 120 converts the converted digital signal sent from the digital signal converting block 116 into a communication digital signal and outputs (transmits) the converted communication digital signal to the ECU 92 of the motor-side conversion unit 90A through the CAN (digital signal line) 126. The CPU 122 conducts calculation for controlling the operation of the digital signal converting block 116 and other components.

The operation power source 124 is installed at an appropriate location of the power source line 128 connecting the CPU 122 and power source 110. Specifically, the boat-side conversion unit 90B, i.e., the CPU 122 is supplied with operation power from the power source 110 through the operation power source 124.

The boat-side conversion unit 90B is also equipped with an indicator processing block (transmitter) 130 that transmits an output indicative of the operating condition of the outboard motor to the indicator 112 (indicator lamp 22) installed in the boat 12. Specifically, the indicator processing block 130 is inputted via the ECU 92, digital signal outputting block 120 and CPU 122 with an output indicative of the operating condition of the outboard motor 10 sent from the coolant temperature sensor 102, processes the output by converting it into a signal (i.e., control signal) that can make the indicator 112 operate and outputs it.

The operation of the outboard motor 10 and boat 12, which are constituted as described in the foregoing, will be explained with reference to FIG. 3 with focus on the conversion unit 90.

The operation (rotational operation) of the steering wheel 16 by the operator displaces the movable member 24*a* of the push-pull cable 24 connected to the steering wheel 16. The analog signal outputting device 114 detects the displacement and outputs an analog signal to the digital signal converting block 116.

The operation (swinging operation) of the shift/throttle lever 20 by the operator displaces the movable member 26*a* of the push-pull cable 26 connected to the shift/throttle lever 20. The analog signal outputting device 114, similarly to the case of the steering wheel 16, detects the displacement and outputs an analog signal to the digital signal converting block 116.

The analog signal outputted from the analog signal outputting device 114 is converted into a digital signal at the digital signal converting block 116 and sent to the digital signal outputting block 120 through the CPU 122. The digital signal outputting block 120 converts the inputted digital signal into a communication digital signal and outputs (transmits) it to the ECU 92 of the motor-side conversion unit 90A through the CAN communication.

Based on the digital signal sent from the digital signal outputting block 120, the ECU 92 controls the operation of the motors 42, 60, 86. Specifically, based on the digital signal obtained by converting the analog signal corresponding to the displacement of the movable member 24*a* generated by the manual operation of the steering wheel 16 and the output from the steering angle sensor 94, the ECU 92 controls the operation of the steering motor 42 such that the steering angle of the outboard motor 10 becomes a value corresponding to the digital signal.

Further, based on the digital signal obtained by converting the analog signal corresponding to the displacement of the movable member 26*a* generated by the manual operation of the shift/throttle lever 20 and the output from the throttle position sensor 96, the ECU 92 controls the operation of the throttle motor 60 such that the throttle opening becomes a value corresponding to the digital signal. Similarly, based on the digital signal obtained by the manual operation of the shift/throttle lever 20 and the output from the shift position sensor 100, the ECU 92 controls the operation of the shift motor 86 so as to establish the shift position corresponding to the digital signal.

The ECU 92 is also inputted with an output indicative of the operating condition of the outboard motor 10 sent from the coolant temperature sensor 102 and the like. The output indicative of the operating condition of the outboard motor 10 is sent to the digital signal outputting block 120 of the boat-side conversion unit 90B through the CAN (digital signal line) 126, and then to the indicator processing block 130 through the CPU 122.

The indicator processing block 130 converts the inputted output indicative of the operating condition of the outboard motor 10 into a control signal for the indicator 112 and transmits (outputs) it to the indicator 112. With this, when engine overheat is detected from, for instance, an output of the coolant temperature sensor 102, the corresponding indicator lamp is lit to inform the operator and to indicate the fact to the operator. Similarly, when abnormality in a component of the outboard motor 10 is detected from an output of a sensor (not illustrated), one of the indicator lamps 22 corresponding thereto is lit to inform the operator.

Thus, it is configured according to the embodiment to have a conversion unit (motor-side conversion unit 90A; boat-side conversion unit 90B) attachable to an outboard motor (10) adapted to be mounted on a boat (12) and having an internal combustion engine (46) that powers a propeller (72), a steering mechanism (mount frame 36) that steers the outboard motor (10), and a shift mechanism (70) that shifts gears to change a moving direction of the boat (12), at least one of which is operable by a mechanical operation mechanism (steering wheel 16, shift/throttle lever 20, push-pull cables 24, 26) installed at the boat (12) to be manually manipulated by an operator, comprising: a boat-side conversion unit (90B) that detects displacement generated at a movable member (24*a*, 26*a*) due to the manual manipulation of the mechanical operation mechanism and converts the detected displacement into an electric signal; an actuator (electric steering motor 42, electric throttle motor 60, electric shift motor 86) that is connected to at least one of the steering mechanism, the shift mechanism and a throttle valve (56) of the engine; and an actuator controller (ECU 92) that is connected to the boat-side conversion unit and controls operation of the actuator based on the converted electric signal.

Owing to this configuration, when an outboard motor installed at a boat equipped with a mechanical operation mechanism should be changed to an electronically-operated outboard motor, it becomes possible to have the electronically-operated outboard motor that can conduct outboard motor steering, shift change or engine speed regulation by means of a hitherto-used mechanical operation mechanism, without newly installing a remote control unit or the like designed for the electronic operation mechanism of the outboard motor. In other words, by simply installing the conversion unit at the outboard motor equipped with the mechanical operation mechanism, it can be easily converted to the electronically-operated outboard motor without newly installing a remote control unit or the like.

Further, since it is configured to further includes: an indicator installed at the boat and an indicator processing block that processes and produces an output indicative of operating condition of the outboard motor to be indicated by the indicator, when the outboard motor equipped with the mechanical operation mechanism has changed to the electronically-operated outboard motor, the indicator of the boat used for the mechanical operation mechanism can still indicate the operating condition of the outboard motor, thereby enabling to inform the operator of the operating condition.

Further, since it is configured such that the boat-side conversion unit comprises: an analog signal outputting device (114) that is connected to the movable member and outputs an analog signal in response to the displacement generated at the movable member due to the manual manipulation of the mechanical operation mechanism; a digital signal converting block (116) that inputs the analog signal outputted by the analog signal outputting device and converts the outputted analog signal into a digital signal; a digital signal outputting block (120) that inputs the digital signal converted by the digital signal converting block and outputs the converted digital signal to the actuator controller; a CPU (122) that controls operation of the analog signal outputting device, digital signal converting block and digital signal outputting block; and a power source (operation power source 124, battery 110) that supplies operation power to the CPU, the foregoing effects can be still enhanced.

Further, since it is configured such that the analog signal outputting device (114) is a sensor that is connected to the movable member to output the analog signal in response to the displacement generated at the movable member due to the manual manipulation of the mechanical operation mechanism, the foregoing effects can be still enhanced.

Further, since it is configured such that the movable member is a movable member (24*a*, 26*a*) of a push-pull cable (24, 26), the foregoing effects can be still enhanced.

It should be noted that, although the potentiometer and slide volume are exemplified as the analog signal outputting device 114 in the foregoing embodiment, it is not a limitation and possible to utilize any sensor or switch that outputs an analog signal (electronic signal) in response to displacement generated at the movable members 24*a*, 26*a* of the push-pull cables.

It should further be noted that, although this invention is explained taking as an example the outboard motor equipped with the engine 46 as the power source of the propeller 72, it is applicable to a hybrid outboard motor equipped with both an engine and electric motor.

Japanese Patent Application No. 2006-193714 filed on Jul. 14, 2006 is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An electrically-operated conversion unit attachable to an outboard motor adapted to be mounted on a boat and having an internal combustion engine that powers a propeller, a steering mechanism that steers the outboard motor, and a shift mechanism that shifts gears to change a moving direction of the boat, at least one of which is operable by a pre-existing mechanical operation mechanism installed at the boat to be manually manipulated by an operator, said conversion unit comprising:

a boat-side conversion unit that detects displacement generated at a movable member due to the manual manipulation of the mechanical operation mechanism and converts the detected displacement into an electric signal;

an actuator that is connected to at least one of the steering mechanism, the shift mechanism and a throttle valve of the engine; and an actuator controller that is connected to the boat-side conversion unit and controls operation of the actuator based on the converted electric signal.

2. The electrically-operated conversion unit according to claim 1, further comprising:

an indicator installed at the boat; and an indicator processing block that processes and produces an output indicative of operating condition of the outboard motor to be indicated by the indicator.

3. The electrically-operated conversion unit according to claim 1, wherein the boat-side conversion unit comprises:

an analog signal outputting device that is connected to the movable member and outputs an analog signal in response to the displacement generated at the movable member due to the manual manipulation of the mechanical operation mechanism;

a digital signal converting block that inputs the analog signal outputted by the analog signal outputting device and converts the outputted analog signal into a digital signal;

a digital signal outputting block that inputs the digital signal converted by the digital signal converting block and outputs the converted digital signal to the actuator controller;

a CPU that controls operation of the analog signal outputting device, digital signal converting block and digital signal outputting block; and a power source that supplies operation power to the CPU.

4. The electrically-operated conversion unit according to claim 3, wherein the analog signal outputting device is a sensor that is connected to the movable member to output the analog signal in response to the displacement generated at the movable member due to the manual manipulation of the mechanical operation mechanism.

5. The electrically-operated conversion unit according to claim 1, wherein the movable member is a movable member of a push-pull cable.

6. The electrically-operated conversion unit according to claim 1, wherein the conversion unit comprises a motor-side conversion unit comprising the actuator and the actuator controller.

7. A electrically-operated conversion unit operably attachable to an outboard motor adapted to be mounted on a boat, said outboard motor comprising an internal combustion engine that powers a propeller, a steering mechanism that steers the outboard motor, a shift/throttle mechanism that is operable to shift gears in order to change a moving direction of the boat, and is operable to manipulate engine speed, the boat comprising a mechanical operation mechanism comprising a steering wheel and a shift/throttle lever installed at the boat to be manually manipulated by an operator;

said conversion unit comprising:

a boat-side conversion unit that operable to detect displacement generated by said steering wheel and by said shift/throttle lever due to manual mechanical operation thereof, and to convert the detected displacements into electric signals;

a plurality of actuators, each connected to a respective one of the steering mechanism, the shift mechanism and a throttle valve mechanism of the engine; and a plurality of actuator controllers, each connected to the boat-side conversion unit and operable to control operation of the respective one of the actuators based on the converted electric signals.

* * * * *